April 28, 1970     W. P. WALLACE ET AL     3,509,355

SOLAR RADIATION INTEGRATOR MOUNTING

Filed Feb. 3, 1967

INVENTORS
WESLEY P. WALLACE
COLBY A. FOSS

BY *Msegader & Douglas*

ATTORNEYS

United States Patent Office 3,509,355
Patented Apr. 28, 1970

3,509,355
SOLAR RADIATION INTEGRATOR MOUNTING
Wesley Perry Wallace, 74 Komohana St., and Colby A. Foss, P.O. Box 434, both of Hilo, Hawaii 96720
Filed Feb. 3, 1967, Ser. No. 613,939
Int. Cl. H01j 5/02
U.S. Cl. 250—239                                    4 Claims

ABSTRACT OF THE DISCLOSURE

A solar radiation integrator in which solar cells or meters are mounted on a pair of plates forming a dihedral plate assembly supported from a shock mounted base plate and in which the cells are mounted behind isolating or scalloped openings which provide for ventilation and do minimize heat conduction from the metal plate to the cell or meter, and thereby, improving thermal and temperature isolation and characteristics for the radiation integrator, and for providing a small pitch of approximately 10° between the dihedral plate and the base metal plate for preventing the collection and puddling of water such as would occur on a level cell mounted plate and for decreasing cosine error especially at low sun angles.

---

The present invention, therefore, is seen to relate to improved mountings for solar radiation integrator components and more particularly relates to a mounting construction and assembly that may include a bubble level, leveling screws disposed throughout the periphery of the mounting plate and for a dihedral plate assembly for supporting solar cells or solar meters, as well as providing isolating or scalloped openings for the passage of radiation therethrough to the solar cell or meter. An object, therefore, of the present invention, is to provide an angular mounting for solar cells to aid in the solar radiation integration of radiation that may impinge on such solar devices, in which the cells are inclined behind isolating or scalloped apertures or openings at approximately 10° with respect to a connecting edge of said inclined plate to the base plate.

A further object of the present invention is to provide an inclined mounting for solar cells to provide certain corrections for surface reflections and cosine error as well as encouraging water run-off where the devices are in an all-weather location, so that the coalescence of fine droplets to one or two large globules that would cause to run-off.

A further object of the present invention is to provide isolating or scalloped mounting to permit insulation or isolation of the cell from heat which would flow from and be retained in the metal plate.

The above and other objects and advantages of the invention will become apparent upon full consideration of the following detailed description and drawings in which.

Figure 1:
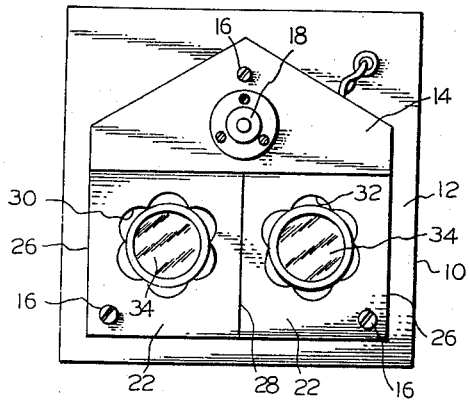
FIGURE 1 is a plan view of the solar radiation integrator mounting arrangement on top of a casing for a solar radiation integrator, in accordance with a preferred embodiment of the present invention.
Figure 2:
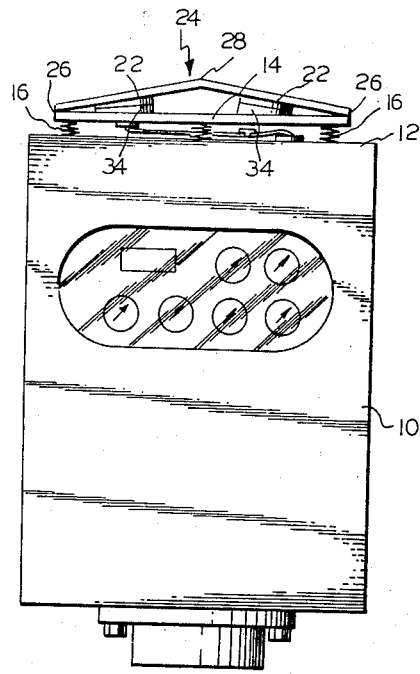
FIGURE 2 is a front elevation view.

Referring now to the drawings, there is shown a casing 10 for a solar radiation integrator, and in which the casing has a top surface 12 on which is mounted a base mounting plate 14 supported by shock absorbing or compression springs 16, 16 adapted to be disposed unto the top surface 12 of the casing to facilitate precise leveling.

The mounting plate is provided with a bubble level 18 for indicating the degree of horizontalness or condition of level of the mounting plate as it is supported from the surface 12 of the casing. Leveling screws for cooperating with compression springs 16 are provided at peripheral spaced portions about the mounting plate 14 for enabling adjustment of the level condition of the mounting plate 14 so that adjustment may be made as desired in the pitch or level condition of the mounting plate 14.

From a pair of opposite edges of the base mounting plate 14, there is connectably disposed a pair of dihedral plates 22, 22 forming a plate assembly 24 which is connected at the edges 26, 26. The dihedral plates 22, 22 are joined or connected at the bend or fold portion 28.

In each of the inclined or dihedral plates 22, 22 there are isolating or scalloped openings 30, 32 extending through each of the plates for exposing a solar cell 34, 34 adjacent thereto to radiation that passes through the plates 22, 22. The cells 34, 34 are mounted on the dihedral plates 22, 22. Also, the isolating openings 30, 32 provide for allowing ventilation and cooling of said solar cells for minimizing heat conduction from the adjacent plates 22, 22 to the body of the solar cells 34, 34.

It is seen that the optimum angle between the dihedral plates 22, 22 with respect to the mounting plate 14 is generally about a 10° angle with the mounting plate as measured from the connecting edges.

A preferred embodiment of the present invention is seen to reside in a scalloped opening 30, 32 since the heat from the plates 22, 22 is not transmitted or translated directly to the solar cell, but is convected or conveyed to the surrounding edges by means of the radiation surfaces provided by the scalloped configuration of the opening, and thus the heat is not focused upon or directed toward the solar cell 34. The bubble level 18 provided for adjusting the inclination or level condition of the mounting plate 14 and by the leveling screws 16, 16 being adjusted accordingly, the pitch or level or the mounting plate can be appropriately adjusted with respect to the casing as desired. It is contemplated within the preferred embodiment of the invention to mount the solar cells generally centrally within the scalloped openings so that the optimum transfer of residual heat in the dihedral plates 22, 22 is not conveyed to the solar cells 34, 34.

Figure 3:
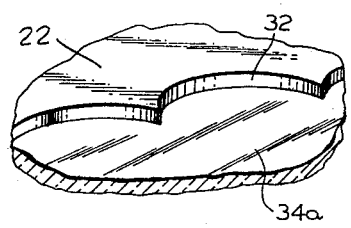
FIGURE 3 is a broken-away and enlarged view of a side of an isolating or scalloped opening passing through the inclined plate.
Figure 4:
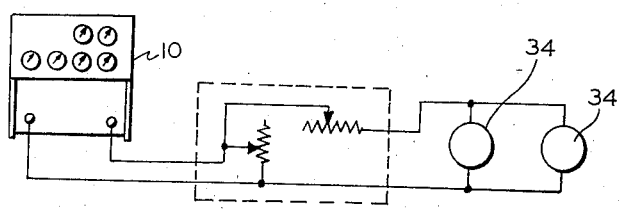
FIGURE 4 is a schematic circuit diagram showing the manner in which the solar radiation integrator cells are connected to the casing.

FIGURE 3 shows the details of the scalloped opening 32 and the glass plate 34a of the solar cell 34.

Additional embodiments of the invention in this specification will occur to others and therefore it is intended that the scope of the invention be limited only by the appended claims and not by the embodiment described herein and above. Accordingly, reference should be made to the following claims in determining the full scope of the invention.

What is claimed is:
1. A solar radiation integrator mounting arrangements comprising
    a casing:
    a mounting plate supported by leveling screws cooperating with compression springs disposed between said mounting plate and said casing to adjust the pitch of said mounting plate;
    solar cells;
    a pair of plates forming a dihedral plate assembly supported from the connecting edges of said mounting plate forming a space therebetween for containing said solar cells;
    an isolating opening within each of said plates for ex- posing said solar cell adjacent to radiation passing therethrough and for allowing ventilation of said solar cell for minimizing heat conduction from the adjacent plate to the body of said solar cell, said dihedral plate assembly forming about a 10° angle with the mounting plate at the connecting edges.

2. The invention according to claim 1 wherein said isolating opening is a scalloped opening.

3. The invention according to claim 1 wherein a bubble level is mounted on said mounting plate.

4. The invention according to claim 2 wherein said solar cells are mounted generally centrally within said scalloped opening.

References Cited

UNITED STATES PATENTS

| | | | |
|---|---|---|---|
| 3,093,744 | 6/1963 | Tabet | 250—239 |
| c,213,286 | 10/1965 | Ehret et al. | 250—239 |
| 3,242,340 | 3/1966 | Layne | 250—239 X |
| 3,390,576 | 7/1968 | Yellott | 73—170 |

JAMES Y. LAWRENCE, Primary Examiner

V. LAFRANCHI, Assistant Examiner

U.S. Cl. X.R.

73—170; 250—208, 220